United States Patent
Numata et al.

(10) Patent No.: US 9,289,921 B2
(45) Date of Patent: *Mar. 22, 2016

(54) METHOD OF FORMING SINGLE-MODE POLYMER WAVEGUIDE ARRAY CONNECTOR

(71) Applicant: International Business Machines Corporation, Armonk, NY (US)

(72) Inventors: Hidetoshi Numata, Kawasaki (JP); Masao Tokunari, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/674,286

(22) Filed: Mar. 31, 2015

(65) Prior Publication Data

US 2015/0202802 A1    Jul. 23, 2015

Related U.S. Application Data

(63) Continuation of application No. 14/014,698, filed on Aug. 30, 2013, now Pat. No. 9,023,256.

(30) Foreign Application Priority Data

Sep. 5, 2012    (JP) ................................. 2012-194909

(51) Int. Cl.
*B29C 33/42*    (2006.01)
*G02B 6/38*    (2006.01)
(Continued)

(52) U.S. Cl.
CPC .......... *B29C 33/424* (2013.01); *B29D 11/0075* (2013.01); *B29D 11/00721* (2013.01);
(Continued)

(58) Field of Classification Search
CPC    B29C 35/0888; B29C 43/021; B29C 43/184; B29C 33/424; B29D 11/00663; B29D 11/00721; B29D 11/0075; G02B 6/10; G02B 6/3885; G02B 6/4231; G02B 6/4403; G02B 6/448; G02B 6/138; G02B 6/3865
USPC ............... 264/1.24, 1.25, 1.38, 1.7, 494, 308, 264/259, 241; 427/508, 163.2; 385/50, 129; 425/513
See application file for complete search history.

(56) References Cited

U.S. PATENT DOCUMENTS 6,227,722 B1 *    5/2001    Kropp ................. G02B 6/4249
385/14

(Continued)

FOREIGN PATENT DOCUMENTS

JP    2004093989    3/2004
JP    2004361613    12/2004
(Continued)

*Primary Examiner* — Alison L Hindenlang
*Assistant Examiner* — Lawrence D Hohenbrink, Jr.
(74) *Attorney, Agent, or Firm* — Fleit Gibbons Gutman Bongini & Bianco PL; Jon A. Gibbons

(57) ABSTRACT

A method of forming a single-mode polymer waveguide array connector that provides precise alignment of a plurality of cores of polymer waveguide arrays with respect to an absolute reference position, such as a guide pin hole in a ferrule, when the polymer waveguide array connector is connected to another polymer waveguide array connector or provides precise alignment of a plurality of cores of a polymer waveguide array and a fiber array with respect to the absolute reference position when the polymer waveguide array connector is connected to a single-mode fiber array connector. A plurality of cores of single-mode polymer waveguide arrays or single-mode fiber arrays is precisely aligned with each other. In addition, there is provided a combination of a plurality of molds, e.g., a first mold (A) and a second mold (B), used in a plurality of processes in a specific method.

5 Claims, 9 Drawing Sheets

(51) Int. Cl.
*B29D 11/00* (2006.01)
*G02B 6/10* (2006.01)
*G02B 6/138* (2006.01)
*G02B 6/44* (2006.01)
*G02B 6/42* (2006.01)
*B29C 35/08* (2006.01)
*B29C 43/02* (2006.01)
*B29C 43/18* (2006.01)

(52) U.S. Cl.
CPC  *G02B6/10* (2013.01); *G02B 6/138* (2013.01); *G02B 6/3865* (2013.01); *G02B 6/3885* (2013.01); *B29C 35/0888* (2013.01); *B29C 43/021* (2013.01); *B29C 43/184* (2013.01); *B29D 11/00663* (2013.01); *B29K 2995/0027* (2013.01); *G02B 6/4231* (2013.01); *G02B 6/4403* (2013.01); *G02B 6/448* (2013.01)

(56) References Cited

U.S. PATENT DOCUMENTS

| | | | |
|---|---|---|---|
| 9,023,256 B2 * | 5/2015 | Numata | G02B 6/3885 264/1.24 |
| 2005/0205885 A1 * | 9/2005 | Nakagawa | G02B 6/138 257/98 |
| 2008/0029931 A1 | 2/2008 | Tada et al. | 264/293 |
| 2008/0128929 A1 | 6/2008 | Colombo et al. | 264/1.24 |
| 2009/0317043 A1 | 12/2009 | Eriyama | 385/129 |

FOREIGN PATENT DOCUMENTS

| JP | 2005003875 | 1/2005 |
|---|---|---|
| JP | 2011017933 | 1/2011 |

* cited by examiner (A)

(B)

REQUIRED POSITIONING PRECISION IN CASE OF SINGLE-MODE LIGHT POLYMER WAVEGUIDE $\delta x < 0.5 \mu m \sim 1.0 \mu m$
$\delta y < 0.5 \mu m \sim 1.0 \mu m$ RELATIONSHIP BETWEEN POSITION OFFSET WITH RESPECT TO ABSOLUTE
REFERENCE POSITION AND COUPLING LOSS IN CASE OF MULTI-MODE LIGHT
POLYMER WAVEGUIDE

METHOD OF FORMING SINGLE-MODE POLYMER WAVEGUIDE ARRAY CONNECTOR

CROSS-REFERENCE TO RELATED APPLICATION

This application is based upon and claims priority from prior U.S. patent application Ser. No. 14/014,698, filed on Aug. 30, 2013, now U.S. Pat. No. 9,023,256, and Japanese patent application number 2012-194909, filed Sep. 5, 2012, the entire contents of which are hereby incorporated by reference herein.

BACKGROUND OF THE INVENTION

1. Field of the Invention

This invention relates generally to waveguides, and more specifically to a method of forming a single-mode polymer waveguide array connector.

2. Description of the Related Art

In the field of building of an optical interconnection system, a polymer waveguide is attracting attention. Compared with an approach involving arranging and fixing a plurality of fibers in an array, the polymer waveguide can provide a more inexpensive optical signal channel with higher reliability because an integrated polymer waveguide array can be formed in a process using the polymer material.

FIG. 1 is a perspective view for illustrating a configuration of a single-mode polymer waveguide array connector.

The waveguide array connector comprises a waveguide array and a plurality of ferrules attached to the opposite ends of the waveguide array. The ferrule is a main component of an optical connector that houses and holds an optical waveguide array or an optical fiber array. There are standards for the shape, size and other aspects of the ferrule, and the ferrule in this example complies with such a standard. However, for simplification of the description, the ferrule is only schematically shown in this drawing.

The waveguide array comprises a plurality of cores and a cladding surrounding the cores. Each of the plurality of cores can independently guide single-mode light entering from one connector to the other connector.

FIG. 2 is a perspective view for illustrating a state of interconnection of two single-mode polymer waveguide array connectors, or a single-mode polymer waveguide array connector and a single-mode fiber array connector.

The two single-mode polymer waveguide array connectors, or the single-mode polymer waveguide array connector and the single-mode fiber array connector, connected to each other are in close contact with each other. The ferrule is a component to house and hold the waveguide array or fiber array in the optical connector.

A plurality of single-mode polymer waveguide array connectors or fiber array connectors can be coupled to each other by such connection, thereby interconnecting optical signal transmission systems.

In a typical example, as illustrated in FIG. 2(A), guide pins are passed through guide pin holes in two ferrules, thereby fixing the ferrules connected to each other.

In this typical example, the center of the guide pin hole is an absolute reference position in connection of two ferrules. However, the method of fixing the ferrules is not limited to this approach. The absolute reference position may vary with the way of mechanical connection and therefore is not limited to, and may be different from, the position in this example.

The plurality of cores separately guides single-mode light. Therefore, in order to achieve efficient optical signal connection with two ferrules are connected to each other, the precision of positioning of the plurality of cores is important.

More specifically, referring to FIG. 2(B), it is important to reduce the offset of the position (x, y) of the center of each core with respect to the absolute reference position in the connecting surfaces (in a two-dimensional plane) of the plurality of cores, that is, errors $\delta x$ and $\delta y$, to fall within an allowable range. (Note that typically y=0 in the case of a single-layered waveguide array.)

FIG. 3 is a graph showing relationships between the offset of the position of a core center with respect to the absolute reference position and the optical signal loss in the connection of connectors in the case of a polymer waveguide for Multi-Mode® light.

As known, the scale of the core (diameter) of the polymer waveguide for multi-mode light is much larger than the size of the core of the polymer waveguide for single-mode light.

However, the multi-mode light is described herein as an example for the purpose of qualitative description. As known, there is a tendency that the larger the offset of the position ("Offset" shown in μm (micron) on the horizontal axis of the graph), the higher the coupling loss (in dB (decibel) on the vertical axis of the graph) becomes.

A method of reading the coupling loss from this graph will be described. As can be seen from the plots being shown by different types of marks, the coupling loss also depends on the size (ranging from 0 μm to 50 μm) of the gap (in the direction perpendicular to the sheet of FIG. 2(B) showing the ferrule connecting surface (in a two-dimensional plane)) between the connecting surfaces of the plurality of ferrules to be connected.

As can be read from this graph, in an ideal state where the size of the gap is reduced to be close to 0 μm, the coupling loss can be reduced to be lower than 0.5 dB if the positioning error of the ferrule connecting surface (in a two-dimensional plane) is reduced to be smaller than 5 μm.

However, in case of handling single-mode light, as known, more strict positioning precision is required. Theoretically, in order to reduce the coupling loss to be equal to or lower than 0.5 dB as in the case of the multi-mode light, positioning has to be achieved with such an extremely high precision that the positioning error $\delta x < 0.5$ μm to 1.0 μm and the positioning error $\delta y < 0.5$ μm to 1.0 μm. Otherwise, the positioning error directly leads to a coupling loss.

In addition, as more ferrules are connected to elongate the optical signal channel, the coupling losses of the ferrules are accumulated.

JP2005-3875A relates to a method of manufacturing a connector-integrated polymer waveguide. With regard to the waveguide manufacturing process, the method that involves forming a core recess according to JP2005-3875A differs from the method according to the present invention in that it does not involves a process of using a plurality of molds.

Concerning the core positioning precision, JP2005-3875A describes that "fixed in a state where the center of the core of the optical waveguide and the center of the connector sleeve are generally on the same straight line" and mentions "using a mold". However, unlike the present invention, there is no mention of an attempt to define the core positioning precision in association with a "ferrule".

JP2005-3875A describes a required core size of a single-mode waveguide and a desired core positioning precision and therefore can be informative in understanding the strictness of the precision.

JP2004-93989A describes a method of manufacturing a waveguide die and a method of manufacturing a waveguide that involves forming a core recess by "pressing" a die with a projection against a cladding material (an embossing process).

The method according to JP2004-93989A significantly differs from the method according to the present invention in that it does not involve pressing from above and below with a plurality of molds (resin molds).

JP2004-361613A discloses a process of manufacturing a polymer waveguide that can be said to be substantially the same as the process according to JP2005-3875A.

JP2011-17933A discloses a technique for solving an object similar to the object of the present invention (to improve the positioning precision of a core of an optical waveguide), although it is useful only as a reference. The technique is to solve the object in a different approach than the present invention.

To begin with, there seems to be no optical waveguide array connector that is capable of handling single-mode light.

SUMMARY OF THE INVENTION

An object of the present invention is to provide a method of forming a single-mode polymer waveguide array connector that can provide precise alignment of a plurality of cores of polymer waveguide arrays when the polymer waveguide array connector is connected to another polymer waveguide array connector or provide precise alignment of a plurality of cores of a polymer waveguide array and a fiber array when the polymer waveguide array connector is connected to a fiber array connector.

To attain the object to provide precise alignment of cores, a method of forming a single-mode polymer waveguide array connector has been radically reviewed as a whole. Specifically, the present invention is implemented by arrangements specifically described in the claim 1 and the following claims.

According to the present invention, there is provided a single-mode polymer waveguide array connector that can be connected to another polymer waveguide array connector or a fiber array connector with a plurality of cores of the polymer waveguide arrays or fiber arrays precisely aligned with each other.

The present invention also provides a combination of a plurality of molds (a first mold (A) and a second mold (B)) used in a partial process of a plurality of processes in a specific method of the present invention.

DESCRIPTION OF THE EMBODIMENTS

The disclosure describes a characteristic method of forming a single-mode polymer waveguide array connector that can provide precise alignment of a plurality of cores of polymer waveguide arrays when the polymer waveguide array connector is connected to another polymer waveguide array connector or provide precise alignment of a plurality of cores of a polymer waveguide array and a fiber array when the single-mode polymer waveguide array connector is connected to a single-mode fiber array connector.

Figure 4:
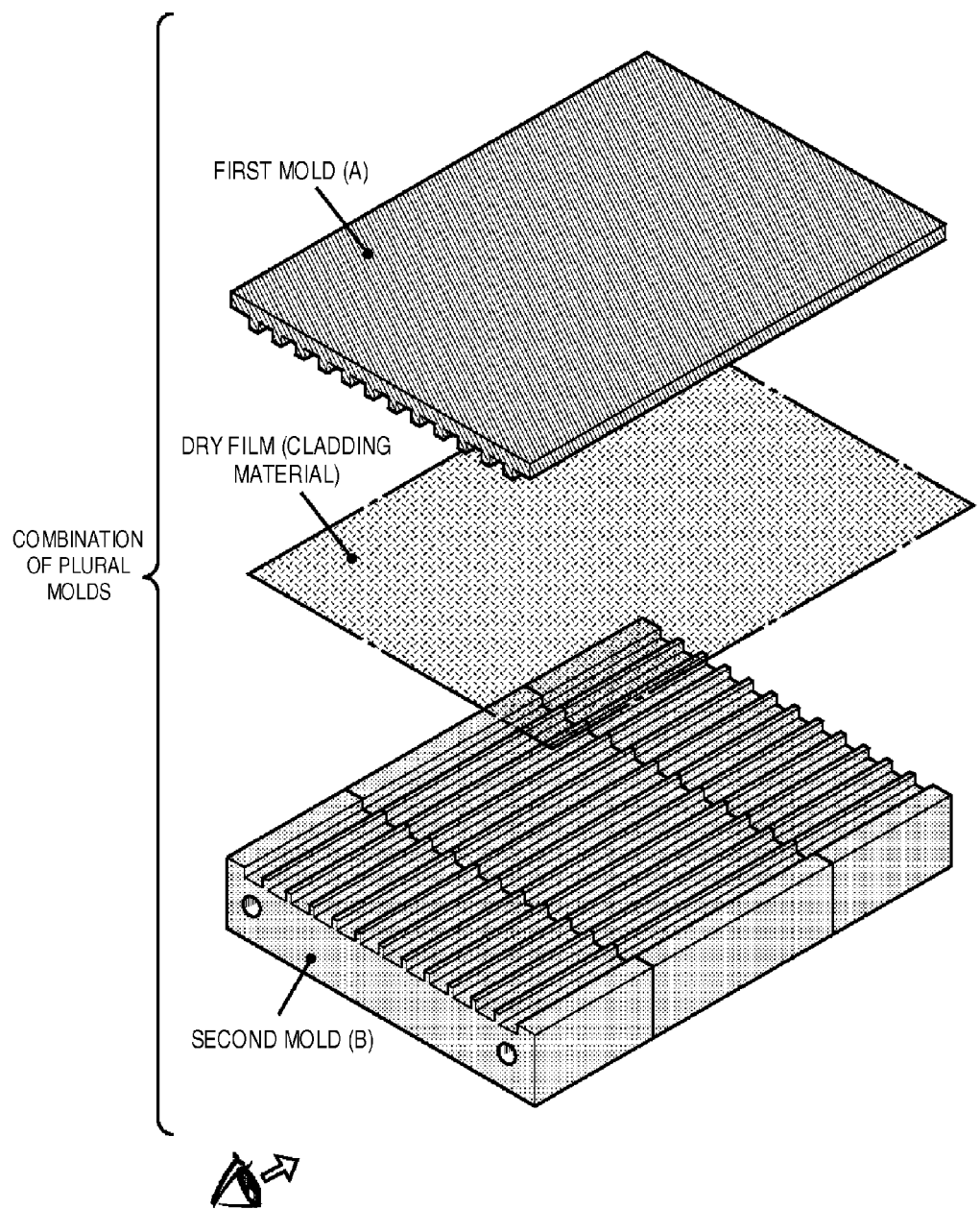
FIG. 4 is a perspective view for illustrating a combination of a plurality of molds (a first mold (A) and a second mold (B)) used in a partial process of a plurality of processes of forming a single-mode polymer waveguide array connector according to the present invention.

FIG. 4 is a perspective view for illustrating a combination of a plurality of molds (a first mold (A) and a second mold (B)) used in a partial process of a plurality of processes of forming a single-mode polymer waveguide array connector.

The first mold (A) has a plurality of ridges (projections) formed on a surface thereof, the ridges being intended to shape a plurality of cores of a waveguide array.

The second mold (B) is to be combined with the first mold (A) and has a plurality of hollows (recesses) formed in a surface thereof, the hollows corresponding to the plurality of ridges (projections) and being intended to shape a cladding portion surrounding the cores of the waveguide array.

The combination of the plurality of molds (the first mold (A) and the second mold (B)) is configured to press a dry film to form a cladding (a cladding material) between the first mold (A) and the second mold (B) arranged with the above-described surfaces thereof facing each other. The dry film may be a laminate film.

The dry film (the cladding material) is not a part of the combination of the plurality of molds (the first mold (A) and the second mold (B)). This drawing shows the positional relationship between the dry film and the plurality of molds in order to explain that the dry film is pressed between the plurality of molds. The dry film (the cladding material) is molded into an under-cladding part, among other parts of the cladding surrounding the cores.

Figure 5:
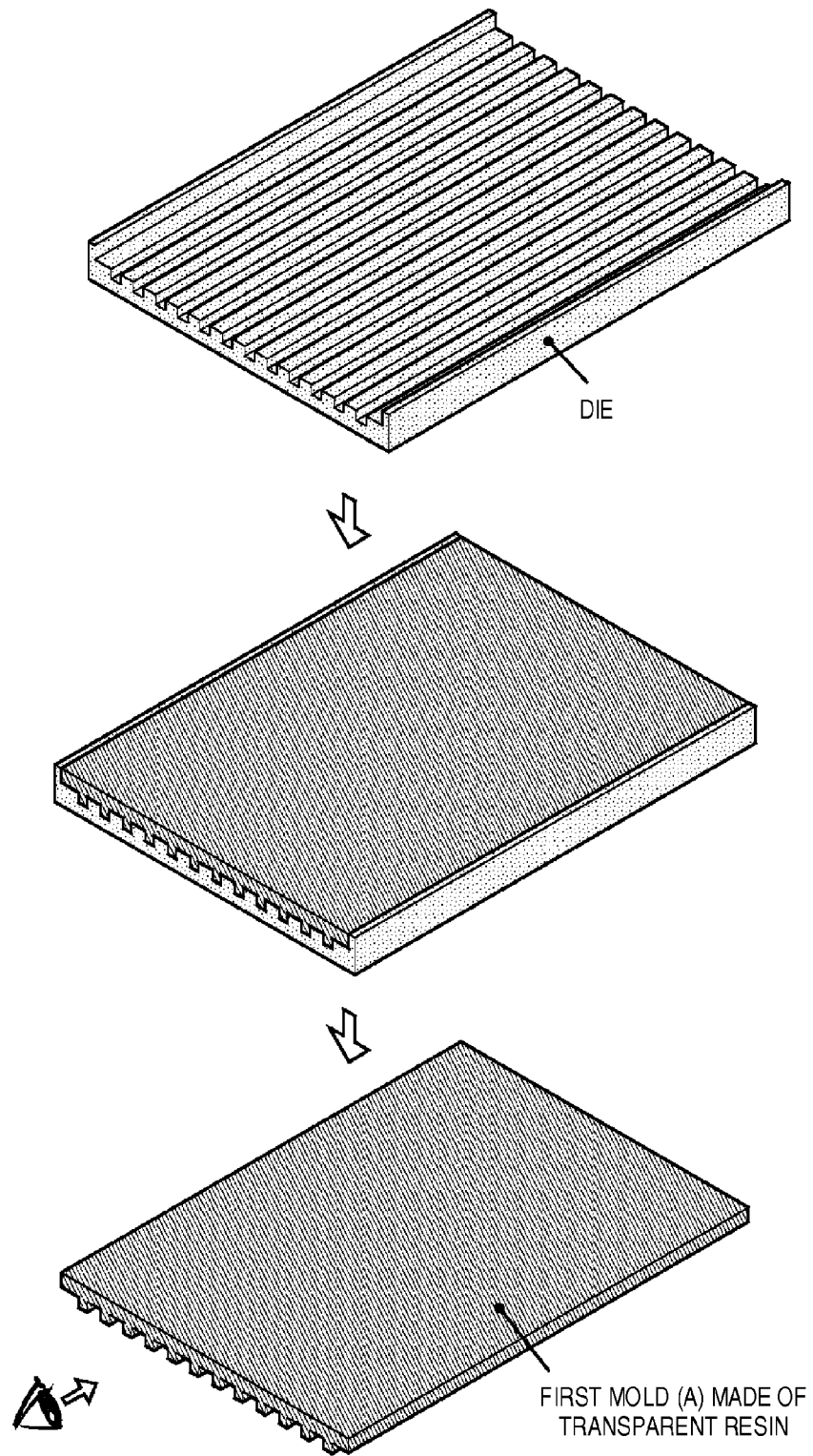
FIG. 5 is a perspective view for illustrating a process of forming the first mold (A) used in a partial process of the plurality of processes of forming the single-mode polymer waveguide array connector according to the present invention.

FIG. 5 is a perspective view for illustrating a process of forming the first mold (A) used in a partial process of the plurality of processes of forming a single-mode polymer waveguide array connector.

The first mold (A) has a plurality of ridges (projections) formed on a surface thereof, the ridges being intended to shape a plurality of cores of the waveguide array. The first mold (A) is made of a transparent resin and may be previously molded in a die.

The first mold (A) does not have to be made of a transparent resin. However, the transparent resin has an advantage that it can transmit UV light in a (subsequent) process of hardening the pressed dry film by exposing the dry film to UV light. In this respect, the term "transparent" should be widely construed as far as the technical effect is achieved.

As shown, the first mold (A) can be easily copied, if the first mold (A) is molded in a die by filling the die with a resin.

In this process, a release agent (a lubricant) may be applied to the inner surface of the die (in order to facilitate subsequent removal of the mold).

However, if a proper material is used for the first mold (A), the first mold (A) can be durable enough for a plurality of pressings during implementation of the method according to the present invention. For example, a harder material than that of the dry film to be pressed can be used.

The dry film to be pressed should be made of a relatively soft material, because the dry film is pressed from above and below between a plurality of dies (made of resin).

As described later in detail, FIG. 9, which will be described later, provides side views (from the human eye) shown in FIG. 5.

Figure 6:
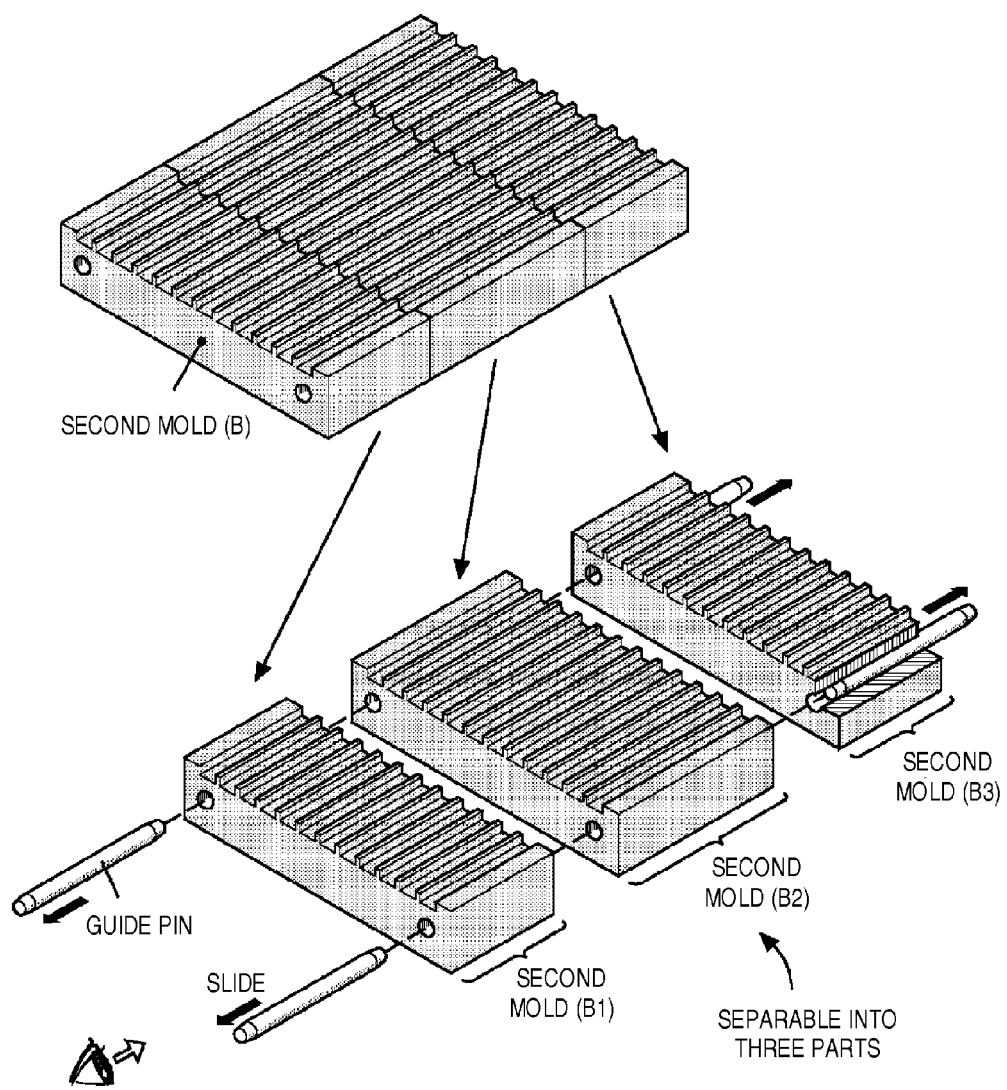
FIG. 6 is a perspective view for illustrating the second mold (B) used in a partial process of the plurality of processes of forming the single-mode polymer waveguide array connector according to the present invention.

FIG. 6 is a perspective view for illustrating the second mold (B) used in a partial process of the plurality of processes of forming the single-mode polymer waveguide array connector according to the present invention.

The second mold (B) can be separated into three parts, a second mold (B1), a second mold (B3) and a second mold (B2).

The second mold (B1) and the second mold (B3) are each coupled to the second mold (B2) by guide pins, so that the second mold (B2) can be removed from the formed waveguide array by sliding the guide pins.

With the technical spirit of the method according to the present invention, those skilled in the art can contemplate various structures for separating the second mold (B) into parts and various structures for maintaining the second mold (B) in the coupled state until the time when it should be separated into parts.

Figure 1:
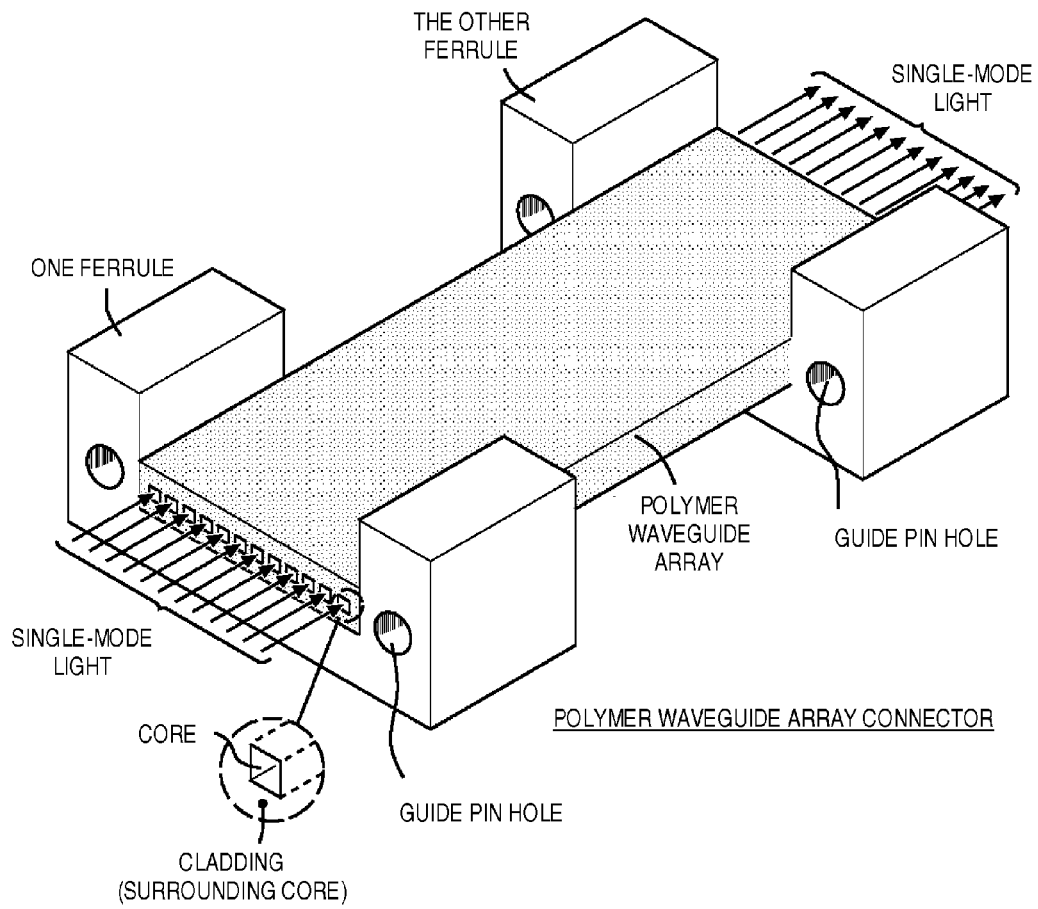
FIG. 1 is a perspective view for illustrating a configuration of a single-mode polymer waveguide array connector.

The single-mode polymer waveguide array connector formed according to the forming method according to the present invention comprises a waveguide array and a plurality of ferrules attached to the opposite ends of the waveguide array, as with the single-mode polymer waveguide array connector described earlier with reference to FIG. 1.

The second mold (B1) and the second mold (B3) correspond to the two parts that are to be inserted, along with the polymer waveguide array, into the interiors of the ferrules.

Figure 7:
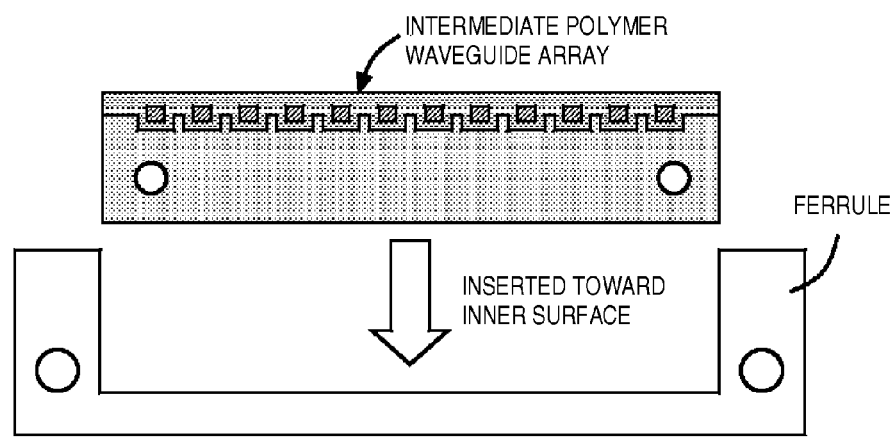
FIG. 7 shows a cross-sectional view and a perspective view for illustrating a way of use of the second mold (B) in a method according to the present invention.
Figure 7:
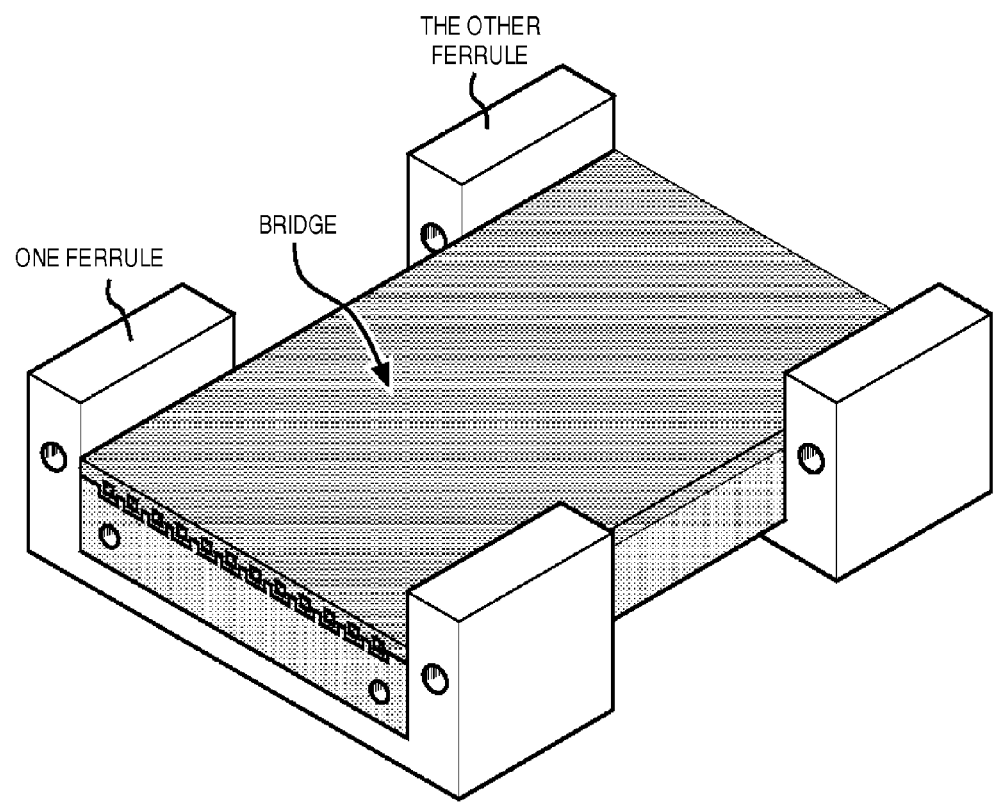

FIG. 7 shows a cross-sectional view and a perspective view for illustrating a way of use of the second mold (B) in the method according to the present invention.

The plurality of ferrules are provided so as to be positioned at the opposite ends of the second mold (B), and the polymer waveguide array is inserted into the interiors of the ferrules so as to bridge the second mold (B) and the ferrules positioned at the opposite ends of the second mold (B).

The second mold (B) serves as a support for the polymer waveguide array.

Figure 8:
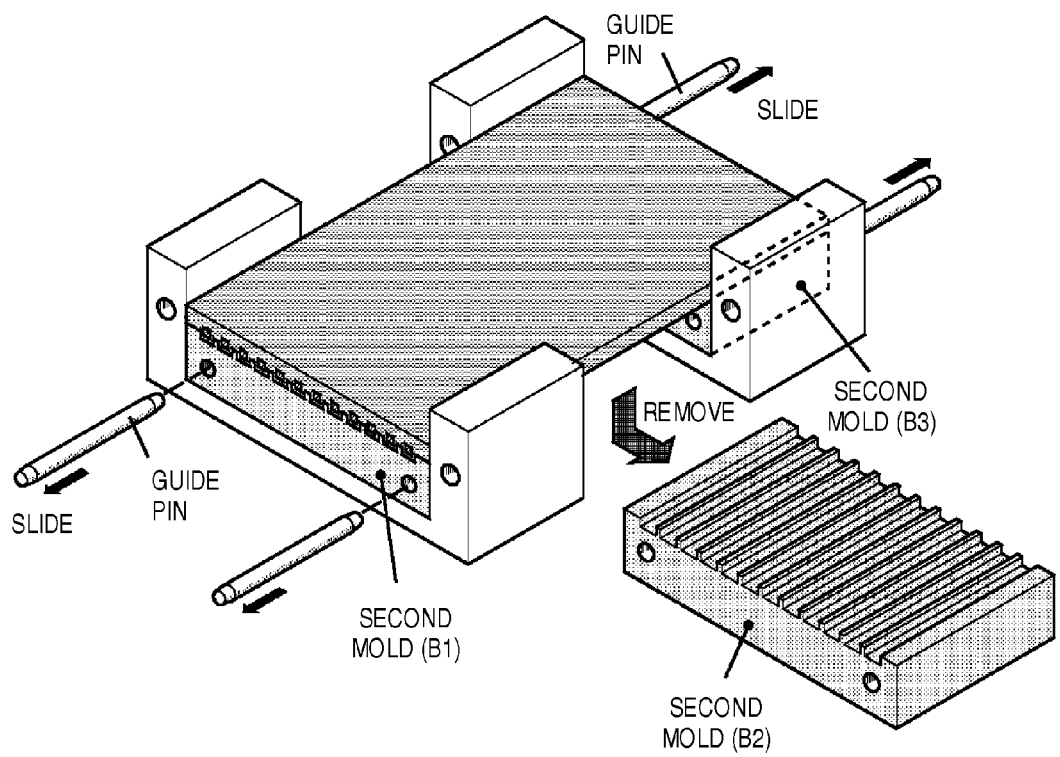
FIG. 8 is a perspective view for illustrating the way of use of the second mold (B) in the method according to the present invention.

FIG. 8 is a perspective view for illustrating a way of use of the second mold (B) in the method according to the present invention.

At a final step, the second mold (B2) is removed from the polymer waveguide array, thereby completing the single-mode polymer waveguide array connector.

If the second (B1) and the second mold (B3) are each coupled to the second mold (B2) by guide pins, the second mold (B2) can be removed from the formed waveguide array by sliding the guide pins.

As described above, the plurality of molds (the first mold (A) and the second mold (B)) play an important role in the characteristic forming method according to the present invention.

Figure 9:
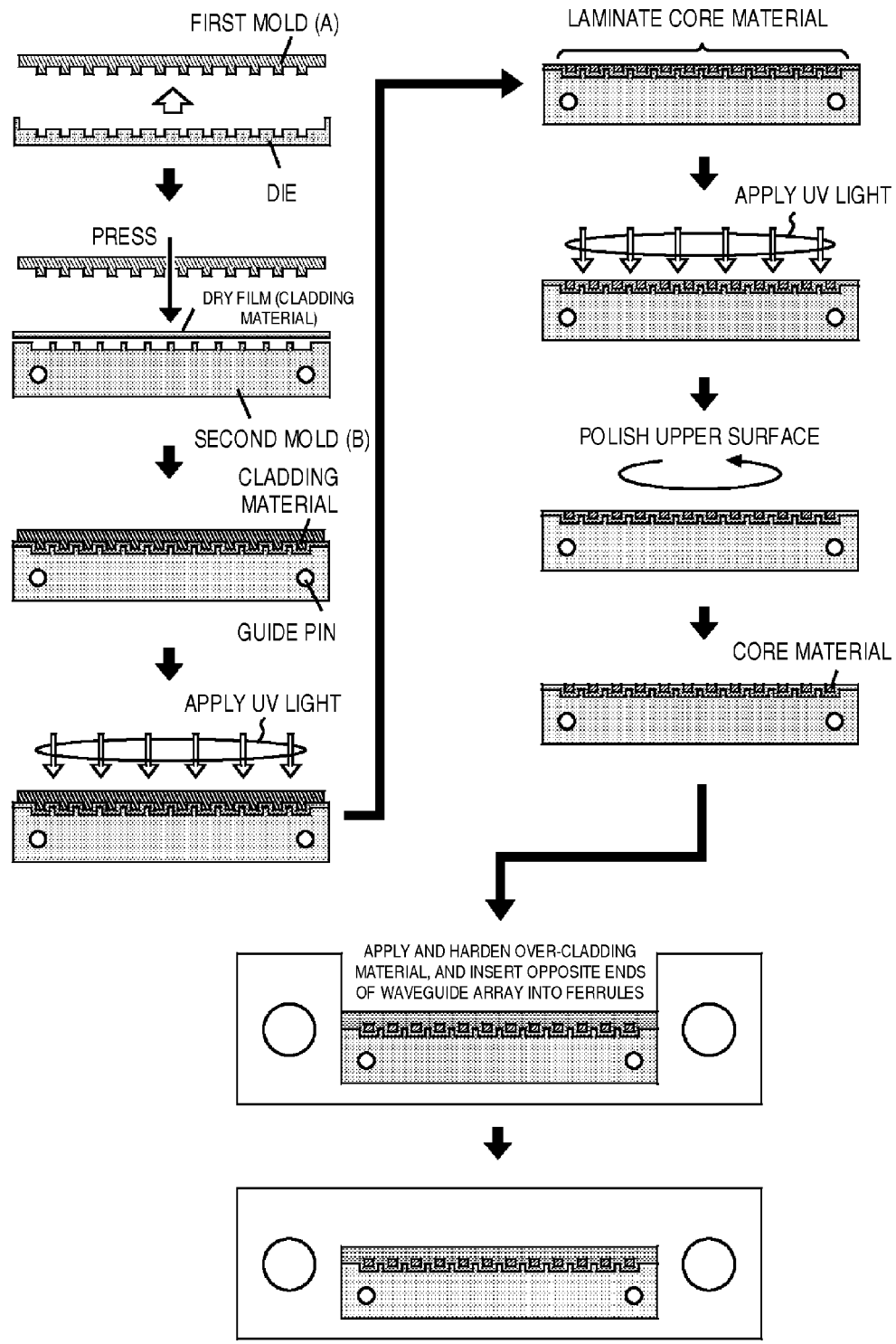
FIG. 9 is a diagram for illustrating a method of forming the single-mode polymer waveguide array connector according to the present invention.

FIG. 9 is a diagram for illustrating the method of forming the single-mode polymer waveguide array connector according to the present invention.

(1) A first mold (A) having a plurality of ridges (projections) formed on a surface thereof, which is intended to shape a plurality of cores of a waveguide array, is provided. The first mold (A) has already been described above with reference to FIG. 5.

(2) A second mold (B) that is to be combined with the first mold (A) and has a plurality of hollows (recesses) formed in a surface thereof, which correspond to the plurality of ridges (projections) and are intended to shape a cladding portion surrounding the cores of the waveguide array, is provided.

(3) A dry film to form the cladding is provided between the first mold (A) and the second mold (B).

(4) The provided dry film is placed between the first mold (A) and the second mold (B) arranged with the above-described surfaces thereof facing each other and pressed (a lamination step).

Figure 2:
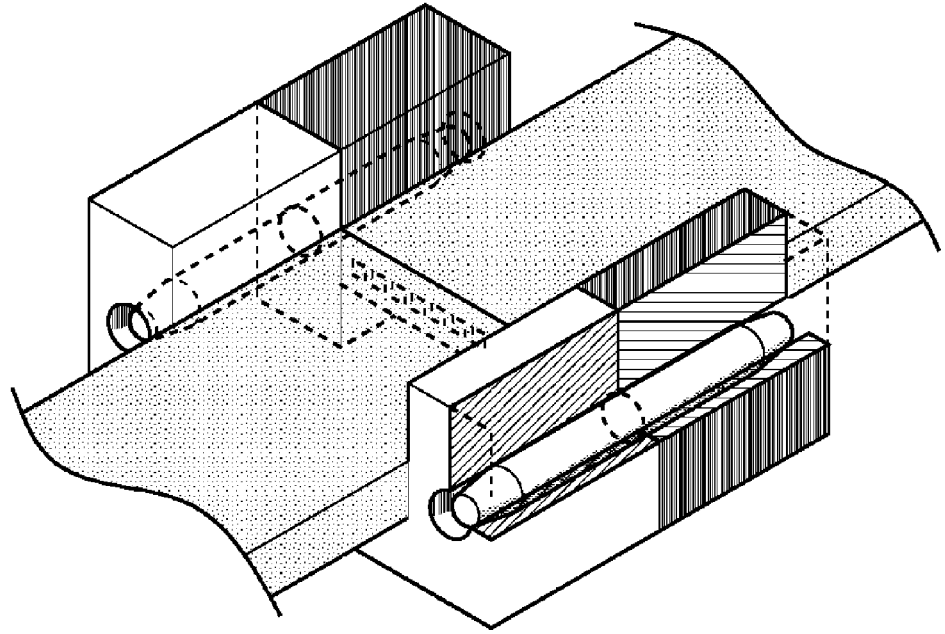
FIG. 2 is a perspective view for illustrating a state of interconnection of two single-mode polymer waveguide array connectors or a single-mode polymer waveguide array connector and a single-mode fiber array connector.
Figure 2:
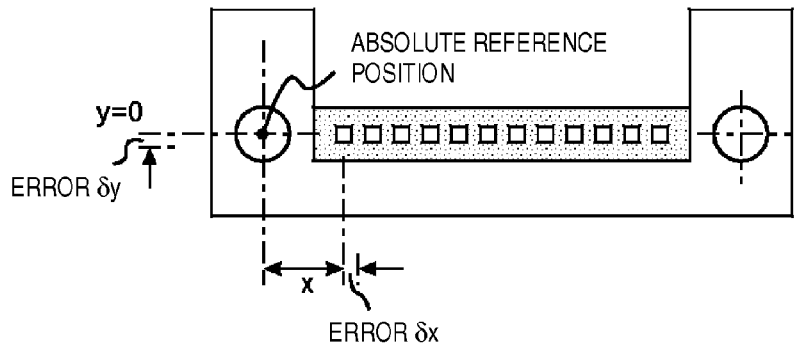
Figure 3:
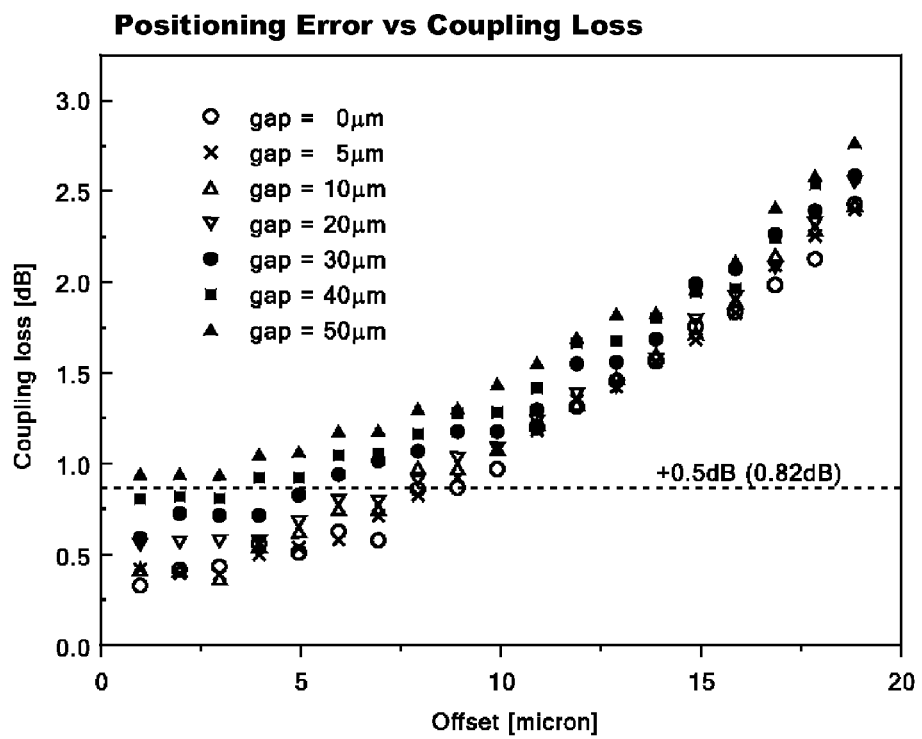
FIG. 3 is a graph showing relationships between the offset of the position of a core center with respect to an absolute reference position and the optical signal loss in connection of connectors in the case of a polymer waveguide for multimode light.

The pressure applied between the first mold (A) and the second mold (B) is important for adjusting the error δy shown in FIG. 2 (for achieving the required precision).

(5) UV light is applied to the pressed dry film, thereby hardening the dry film.

By completely hardening the dry film as an under-cladding material, the plurality of ridges (projections) formed on the surface of the first mold (A) and the corresponding plurality of hollows (recesses) formed in the surface of the mold (B) are accurately impressed (transferred) onto the dry film.

(6) The plurality of trench portions (recesses) formed in the hardened dry film is laminated with a core material (a dry film). The plurality of trench portions (recesses) is formed in conformity with the shapes of the plurality of ridges (projections).

The trench portions may be laminated with an excessive amount of core material. Caution should be exercised to completely fill the plurality of trench portions (recesses) with the core material without forming any cavity (void) between the core and the cladding.

(7) UV light is applied to the charged core material to harden the core material.

(8) The upper surface of the hardened core material is polished to provide an intermediate polymer waveguide array.

The polishing is intended to adjust the height of the core material, flatten the upper surface of the material, and make the plurality of trench portions (recessed) full of the core material up to the upper edge thereof. The excess of the core material is removed in this step.

Light propagates through the waveguide by reflections on the boundary between the core and the cladding. Therefore, the process of defining the boundary of the core is an important process for adjusting (achieving the required precision of) the y-directional positions of the core and the cladding shown in FIG. 2.

(9) An over-cladding material is applied onto the hardened core material and the hardened under-cladding material.

The over-cladding material applied onto the hardened core material and the under-cladding material is hardened.

The over-cladding material is preferably the same as the under-cladding material or a material having a refractive index (optical property) close to that of the under-cladding material and more preferably a material compatible with the under-cladding material hardened.

(10) The plurality of ferrules is provided so as to be positioned at the opposite ends of the second mold (B).

(11) The polymer waveguide array is inserted into the interiors of the plurality of ferrules so as to bridge the second mold (B) and the plurality of ferrules provided at the opposite ends of the second mold (B). This step has already been described above with reference to FIG. 7.

(12) The second mold (B2) of the second mold (B) is removed from the formed waveguide array. This step has already been described above with reference to FIG. 8.

The single-mode polymer waveguide array connector is formed by the characteristic process according to the present invention described above.

According to standards for quartz fiber MT (such as IEC 1754-51996 and JIS C05981 1998), the number of cores is defined as 2, 4, 8, 10 or 12 (or 16). According to standards for polymer waveguide MT (JPCAPE03-01-07S 2006), the number of cores is defined as 8 or 12.

In the description of the present invention with reference to the drawings, it is assumed that there are 12 cores. However, the technical spirit of the present invention can be widely applied as far as there is a plurality of cores, and the description of the present invention shall not be construed as limiting or restricting the scope of the present invention.

What is claimed is:

1. A combination of a plurality of molds used in a partial process of a plurality of processes of forming a single-mode polymer waveguide array connector, the waveguide array connector comprising a waveguide array and a plurality of ferrules attached to opposite ends of the waveguide array, the waveguide array comprising a plurality of cores and a cladding surrounding the cores, each core being capable of independently guiding single-mode light entering from one ferrule to another ferrule, the combination of a plurality of molds comprising:

a first mold (A) having a plurality of ridges (projections) formed on a surface thereof, the ridges (projections) being intended to shape the plurality of cores of the waveguide array; and a second mold (B) to be combined with the first mold (A) and having a plurality of hollows (recesses) formed in a surface thereof, the hollows (recesses) corresponding to the plurality of ridges (projections) and being intended to shape the cladding portion surrounding the cores of the waveguide array, wherein a dry film to form the cladding is pressed (laminated) between the first mold (A) and the second mold (B) arranged with said surfaces thereof facing each other, and wherein the second mold (B) is separable into three parts; a B1 part and a B3 part, which are two parts to be inserted along with the polymer waveguide array into interiors of the plurality of ferrules, and a B2 part.

2. The combination of a plurality of molds according to claim 1, wherein the first mold (A) is made of a transparent resin and is previously molded in a die.

3. The combination of a plurality of molds according to claim 1, wherein the B1 part and the B3 part are each coupled to the B2 part by a guide pin, and wherein the B2 part is removable from the waveguide array by sliding the guide pin.

4. The combination of a plurality of molds according to claim 1, wherein a height of a center (absolute reference position) of a guide pin in each of the ferrules at the opposite ends and heights of (centers of) the plurality of cores in each of the ferrules at the opposite ends are the same (with a precision of less than 1 µm).

5. The combination of a plurality of molds according to claim 4, wherein a height of a center (absolute reference position) of a guide pin in each of the ferrules at the opposite ends and heights of (centers of) the plurality of cores in each of the ferrules at the opposite ends are the same (with a precision of 0.5 µm).

* * * * *